United States Patent
Leinbach

(10) Patent No.: US 11,970,314 B2
(45) Date of Patent: Apr. 30, 2024

(54) FOOD STORAGE CONTAINER

(71) Applicant: Big Bee, Little Bee LLC, Cedar Park, TX (US)

(72) Inventor: Amy Leinbach, Cedar Park, TX (US)

(73) Assignee: Big Bee, Little Bee LLC, Cedar Park, TX (US)

( * ) Notice: Subject to any disclaimer, the term of this patent is extended or adjusted under 35 U.S.C. 154(b) by 0 days.

(21) Appl. No.: 18/129,821

(22) Filed: Mar. 31, 2023

(65) Prior Publication Data

US 2023/0312188 A1 Oct. 5, 2023

Related U.S. Application Data

(60) Provisional application No. 63/418,343, filed on Oct. 21, 2022, provisional application No. 63/326,234, filed on Mar. 31, 2022.

(51) Int. Cl.
| | |
|---|---|
| *B65D 43/16* | (2006.01) |
| *A47J 47/14* | (2006.01) |
| *B65D 43/22* | (2006.01) |

(52) U.S. Cl.
CPC ............ *B65D 43/167* (2013.01); *A47J 47/14* (2013.01); *B65D 43/22* (2013.01);
(Continued)

(58) Field of Classification Search
CPC ............................. B65D 43/167; B65D 43/22; B65D 2251/105; B65D 43/166; B65D 43/162
(Continued)

(56) References Cited

U.S. PATENT DOCUMENTS 2,737,311 A * 3/1956 Blacher ................. A45C 13/04
16/374
3,334,714 A * 8/1967 Gordon ................. A45C 11/00
190/117
(Continued)

FOREIGN PATENT DOCUMENTS

AU 2013101003 A4 8/2013
CH 686775 A5 * 6/1996 ........... B29C 33/301
(Continued)

OTHER PUBLICATIONS

English translation of CH 686 775. (Year: 2023).*
(Continued)

*Primary Examiner* — James N Smalley
(74) *Attorney, Agent, or Firm* — Headland Law & Strategy; Matthew J. Smyth

(57) ABSTRACT

A storage container may include a frame structure having a hinge with a pivot axis, a first frame component, and a second frame component coupled to the first frame component by a hinge; a first shell and a second shell; and one or more securing structures configured to facilitate isolation of an interior volume from the space exterior to the interior volume and maintenance of the storage container in a closed configuration. The first shell and second shell may be configured to be releasably secured by the first frame component and second frame component, respectively. When the first shell is secured by the first frame component, the second shell is secured by the second frame component, and the storage container is a closed configuration, an interior volume bounded by the frame structure, first shell and second shell may be isolated from a space exterior to the interior volume.

20 Claims, 6 Drawing Sheets

(52) U.S. Cl.
CPC ............... *B65D 2251/1058* (2013.01); *B65D 2543/00203* (2013.01); *B65D 2543/00296* (2013.01); *B65D 2543/00305* (2013.01)

(58) Field of Classification Search
USPC ........................................................ 220/839
See application file for complete search history.

(56) References Cited

U.S. PATENT DOCUMENTS

| | | | | |
|---|---|---|---|---|
| 3,477,091 | A | * | 11/1969 | Gordon ................ E05D 1/02 220/829 |
| 4,452,373 | A | * | 6/1984 | Pearce ................. A45C 11/24 220/829 |
| 4,546,874 | A | * | 10/1985 | Kirchhan ............. B65D 53/02 220/678 |
| 4,555,043 | A | * | 11/1985 | Bernhardt .......... B65D 43/0218 220/257.1 |
| 5,069,354 | A | * | 12/1991 | Tannenbaum ....... B65D 11/188 190/122 |
| 5,782,371 | A | * | 7/1998 | Baerenwald ......... B65D 43/168 220/4.24 |
| 6,231,237 | B1 | | 5/2001 | Geller |
| 8,430,262 | B2 | | 4/2013 | Corbett et al. |
| 9,119,507 | B2 | * | 9/2015 | Abrams ............... A47J 41/0022 |
| 9,284,099 | B2 | | 3/2016 | Giraud et al. |
| 10,220,982 | B2 | | 3/2019 | Albers |
| 10,253,918 | B2 | | 4/2019 | McCormick |
| 10,479,041 | B2 | | 11/2019 | Steele |
| 10,676,225 | B2 | | 6/2020 | Malcolm |
| 11,124,330 | B2 | | 9/2021 | Maguire et al. |
| 11,192,698 | B2 | | 12/2021 | Freedman et al. |
| 11,425,933 | B2 | | 8/2022 | Tidwell et al. |
| 2006/0201958 | A1 | * | 9/2006 | Tieben ............. H01L 21/67353 220/4.23 |
| 2007/0196542 | A1 | | 8/2007 | Rathbone et al. |
| 2008/0073349 | A1 | | 3/2008 | Ellswood et al. |
| 2010/0000993 | A1 | * | 1/2010 | Cronin ................ B65D 43/168 220/4.23 |
| 2010/0300919 | A1 | | 12/2010 | Alipour |
| 2011/0215023 | A1 | | 9/2011 | Archie, Jr. et al. |
| 2014/0270579 | A1 | | 9/2014 | Nouri |
| 2020/0391927 | A1 | | 12/2020 | Markarian et al. |

FOREIGN PATENT DOCUMENTS

| | | |
|---|---|---|
| DE | 102004005972 A1 | 9/2005 |
| GB | 2518145 B | 10/2017 |

OTHER PUBLICATIONS

The Container Store, "Porter Reusable Stand Up Bag," website, retrieved on Oct. 12, 2022, pp. 1, available at: Containerstore.com/s/kitchen/food-storage/25/porter-reusabl-stand-up-bag/12pd?productId=11015908.

Stasher, "Sandwich Two-Tone 3-Pack," website, retrieved on Oct. 12, 2022, pp. 1, available at: https://www.stasherbag.com/products/sandwich-two-tone-trio.

* cited by examiner

FOOD STORAGE CONTAINER

CROSS-REFERENCE TO RELATED APPLICATIONS

This application claims the benefit of U.S. Provisional Application Ser. No. 63/326,234, titled "Food Wrap Storage Device," filed on Mar. 31, 2022, and U.S. Provisional Application Ser. No. 63/418,343, titled "Food Storage Container," filed on Oct. 21, 2022. This application incorporates the entire contents of the foregoing application(s) herein by reference.

TECHNICAL FIELD

This disclosure relates to food storage containers.

BACKGROUND

Food storage containers may be bulky, difficult to clean and have lids and bottoms that may become separated.

SUMMARY

In some implementations, a storage container includes a frame structure having a hinge with a pivot axis, a first frame component, and a second frame component; a first shell and a second shell; and one or more securing structures configured to facilitate (x) isolation of an interior volume from the space exterior to the interior volume and (y) maintenance of the storage container in a closed configuration. A hinge may couple the first frame component and the second frame component and be configured to facilitate rotation about the pivot axis (i) of the first frame component away from the second frame component to achieve an open configuration or (ii) of the first frame component toward the second frame component to achieve a closed configuration. The first shell may be configured to be releasably secured by the first frame component, and the second shell may be configured to be releasably secured by the second frame component. When the first shell is secured by the first frame component, the second shell is secured by the second frame component, and the storage container is a closed configuration, an interior volume bounded by the frame structure, first shell and second shell may be isolated from a space exterior to the interior volume.

The frame structure may comprise a material having a Shore A durometer of about 50 to about 80, and at least one of the first shell or the second shell may comprise a food-grade silicone having a Shore A durometer of about 35-45. At least one of the first shell or the second shell may comprise a semi-translucent food-grade silicone. The frame structure may comprise a polypropylene, plastic, polymer, stiff rubber or silicone.

The first frame component and the second frame component may include tabs at corresponding corners that are configured to allow a user to pinch together the first frame component with its corresponding first shell and the second frame component with its corresponding second shell or to pull apart the first frame component with its corresponding first shell from the second frame component with its corresponding second shell.

The first shell may include a seating edge around a first-shell inner perimeter and the second shell may include a raised ridge around a second-shell inner perimeter; the seating edge and raised ridge may be configured to form a friction fit that isolates an interior volume of the first shell and the second shell, when the frame structure is in the closed configuration, from a space exterior to the interior volume. The friction fit may be liquid tight.

In some implementations, a storage container includes (A) a frame structure having a hinge with a pivot axis, a first frame component, and a second frame component; the hinge coupling the first frame component and the second frame component and configured to facilitate rotation about the pivot axis (i) of the first frame component away from the second frame component to achieve an open configuration or (ii) of the first frame component toward the second frame component to achieve a closed configuration; (B) a first shell that is configured to be releasably secured by the first frame component, and a second shell that is configured to be releasably secured by the second frame component; whereas, when the first shell is secured by the first frame component, the second shell is secured by the second frame component, and the storage container is a closed configuration, an interior volume bounded by the frame structure, the first shell and the second shell is isolated from a space exterior to the interior volume; and (C) one or more securing structures configured to facilitate (x) isolation of the interior volume from the space exterior to the interior volume and (y) maintenance of the storage container in a closed configuration. The first shell and the second shell may comprise a food-grade silicone. The first shell and the second shell may comprise a flexible material.

The one or more securing structures may include a raised protrusion disposed in the first frame component and a corresponding receiving aperture in the second frame component, wherein the raised protrusion and the corresponding receiving aperture are configured to form, when engaged, a compression fit that releasably secures the first frame component to the second frame component.

The one or more securing structures may include a slidable locking member that is actuatable in either a locked or unlocked position; wherein, in the locked position, the slidable locking member engages locking members of both the first frame component and the second frame component to prevent them from being separated; and wherein, in the unlocked position, the slidable locking member does not engage both the locking members, thereby allowing the first frame component and second frame component to be separated.

The first frame component may include a raised ridge about its inner perimeter, and the second frame component may include a corresponding seating edge about its inner perimeter, such that in a closed configuration, the raised edge and corresponding seating edge cooperate to form a friction fit that resists separation of the first frame component and the second frame component. The friction fit may further resist passage of liquid from the interior volume to the space exterior to the interior volume.

One of the first frame component and the first shell may include a dovetail pin and the other one of the first frame component and the first shell may include a dovetail tail.

The frame structure may include a material having a Shore A durometer of about 50 to about 80, and at least one of the first shell or the second shell may include a material having a Shore A durometer of about 35-45. The frame structure may include a polypropylene, plastic, polymer, stiff rubber or silicone; and the first shell and the second shell may comprise a food-grade silicone.

The hinge may be reinforced with fibers perpendicular to its pivot axis. The hinge may be a distinct component from the first frame component and second frame component and may be coupled to the first frame component and to the second frame component.

BRIEF DESCRIPTION OF THE DRAWINGS

FIGS. 6B-1, 6B-2 and 6B-3 illustrate exemplary retention elements.

FIGS. 6D-1, 6D-2 and 6D-3 illustrate various aspects of an exemplary locking mechanism.

DETAILED DESCRIPTION

Figure 1:
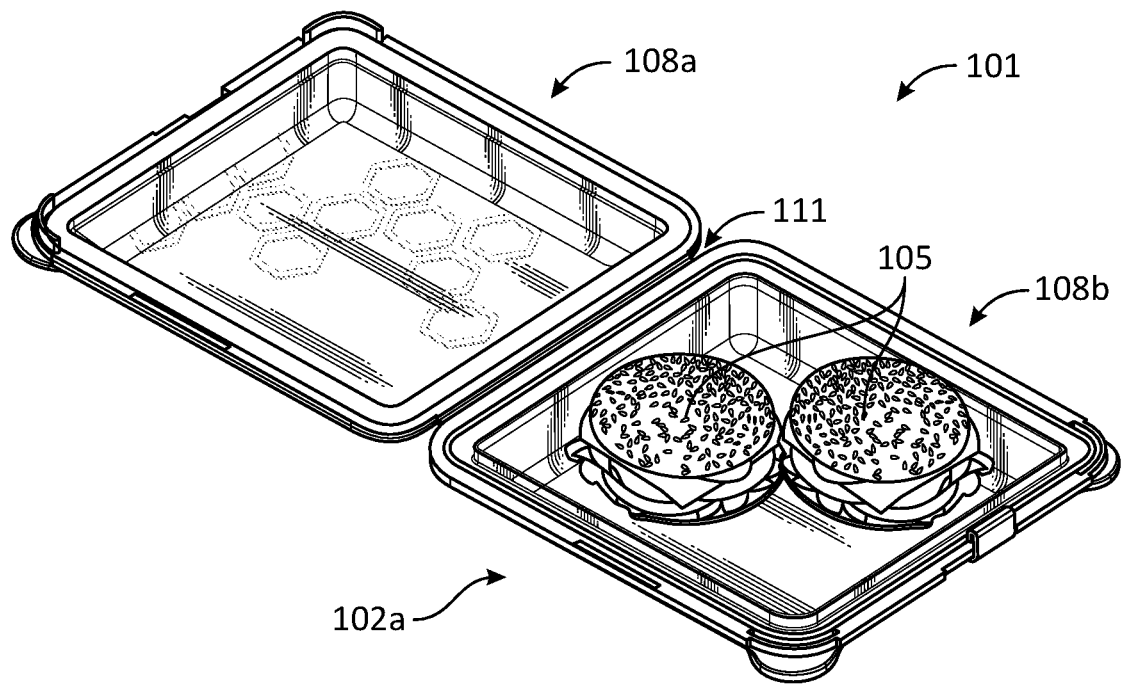
FIG. 1 is a perspective view of an exemplary storage container in an open configuration.

FIG. 1 is a perspective view of an exemplary food storage container 101 in an open configuration 102a. As shown in one implementation, the food storage container 101 is configured to hold food items 105 (or other items, such as utensils, sauces, spreads, etc.) that may comprise or accompany a portion of food suitable for a single meal or small number of food servings. The food storage container 101 may include a first lid 108a and a second lid 108b, which, as shown, may be coupled by a hinge 111.

Figure 2:
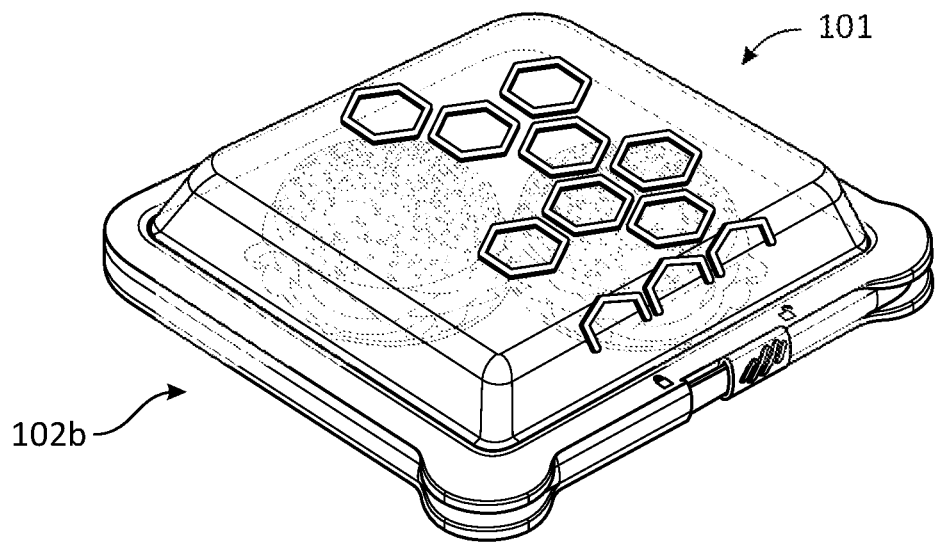
FIG. 2 is a perspective view of the exemplary storage container of FIG. 1 in a closed configuration.

FIG. 2 is a perspective view of the exemplary food storage container 101 shown in FIG. 1, in a closed configuration 102b. As shown in one implementation, at least a portion of the first lid 108a and/or the second lid 108b may be translucent or semi-translucent (e.g., see-through, or partially see-through), such that food items 105 or other items stored inside an interior volume of the food storage container 101 are at least partially visible (e.g., such that food items 105, or at least their outlines, shape and color are partially discernable), even in the closed configuration 102b.

Figure 3:
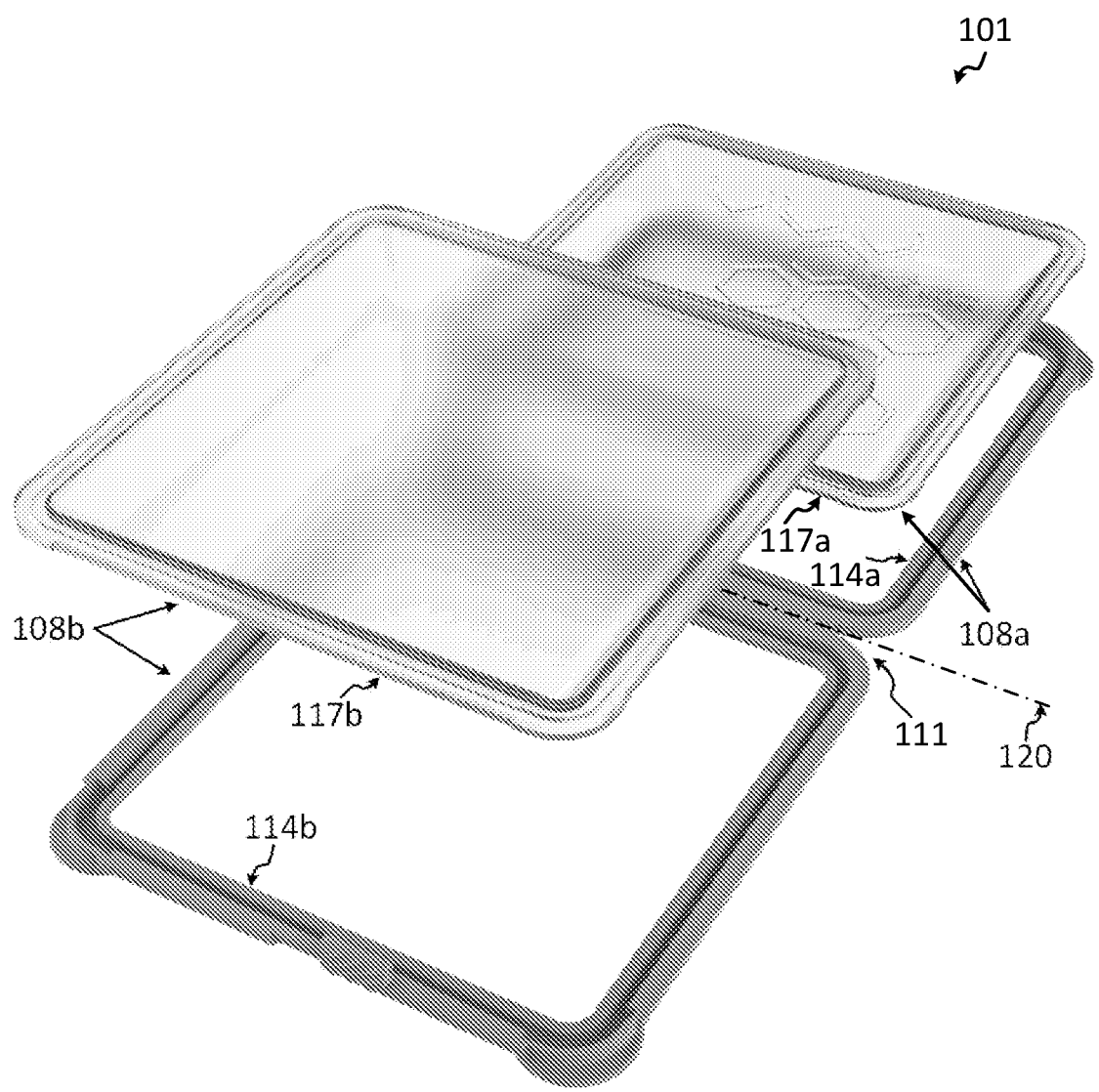
FIG. 3 is an exploded perspective view of an exemplary storage container.

FIG. 3 is an exploded perspective view of one implementation of the food storage container 101. As shown, the first lid 108a comprises a first frame component 114a and a first shell 117a; and the second lid 108b comprises a second frame component 114b and a second shell 117b. In some implementations, the first shell 117a is releasably secured by the first frame component 114a; and the second shell 117b is releasably secured by the second frame component 114b. In such implementations, a design whereby the first and second shells 117a and 117b can be removed from the corresponding first and second frame components 114a and 114b may facilitate deeper cleaning of the first shell 117a and second shell 117b (and first frame component 114a and second frame component 114b) than may otherwise be possible. In addition, such a design may facilitate swapping out of one shell for another, differently dimensioned shell (e.g., one shell may be shallower, while an alternative shell may be deeper— facilitating storage of differently sized food items; one shell may have a single compartment, while another shell may be divided into two or more partitions).

In some implementations, the first and second frame components 114a and 114b are made of a relatively more rigid material than the first and second shells 117a and 117b. For example, the first and second frame components 114a and 114b may be made of a polypropylene plastic, another plastic or polymer, or a stiff rubber or silicone (e.g., one having a Shore A durometer of about 50 to about 80 or a Rockwell R hardness of about 20 to about 90). In contrast, in some implementations, the first and second shells 117a and 117b may be made of a relatively softer and more flexible material, such as a silicone or food-grade silicone (e.g., one having a Shore A durometer of about 25-60; one having a Shore A durometer of about 35-45; one having a Shore A durometer of about 40; etc.). (As used herein, "about" or "approximately" or "substantially" may mean within 1%, or 5%, or 10%, or 20%, or 50%, or 100% of a nominal value). In such implementations, a relatively harder material for the first and second frame components 114a and 114b may provide structural stability; while a relatively softer material (and, in some implementations, a flexible material) for the first and second shells 117a and 117b may enable the first and second shells 117a and 117b to conform to food items contained therein or to spaces in which the food storage container 101 is disposed.

In some implementations, the materials that make up the first and second frame components 114a and 114b and first and second shell components 117a and 117b (and other components) may comprise food-grade materials (e.g., food-grade silicone) or materials that have been treated (e.g., coated) with a finish that renders them food-grade or that otherwise resists microbial growth, mold, etc.

In some implementations, the first frame component 114a and second frame component 114b are coupled by a hinge 111 that is configured to rotate about a hinge axis 120. In the implementation shown in FIG. 3, counterclockwise rotation of the first frame component 114a about the hinge axis 120 can result in the food storage container 101 being transitioned to a closed configuration 102b (see FIG. 2); and clockwise rotation of the first frame component 114a about the hinge axis 120 can result in the food storage container 101 being transitioned to an open configuration 102a (see FIG. 1).

Figure 4:
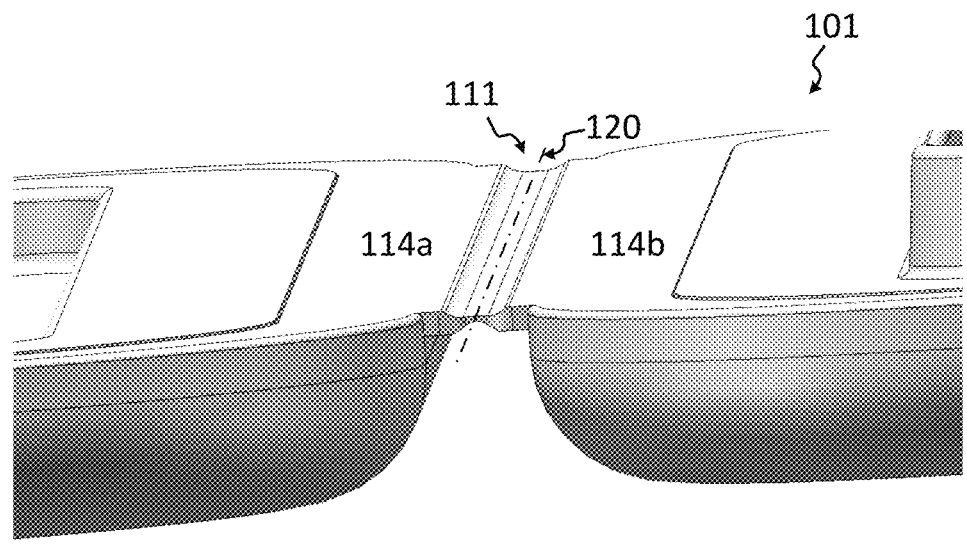
FIG. 4 illustrates exemplary detail of a hinge, in one implementation.

FIG. 4 illustrates additional detail of the hinge 111, in one implementation. As shown, the hinge 111 may comprise a narrowed portion of material that couples the first frame component 114a and the second frame component 114b. The material may be a polypropylene plastic or other material that can withstand bending over a long period of time and large number of iterations (e.g., as the hinge 111 is actuated to close or open the food storage container 101). In some implementations, the hinge 111 may be reinforced to increase its capacity for bending (e.g., with fibers or other materials (not shown) that are disposed perpendicular to the axis 120 of the hinge 111). In other implementations, the hinge 111 may be a separate component (e.g., a mechanical metal or plastic component with interlocking elements and a hinge pin) that is coupled to (e.g., with adhesive, screws, fasteners, over-molding, etc.) the first frame component 114a and the second frame component 114b.

Figure 5:
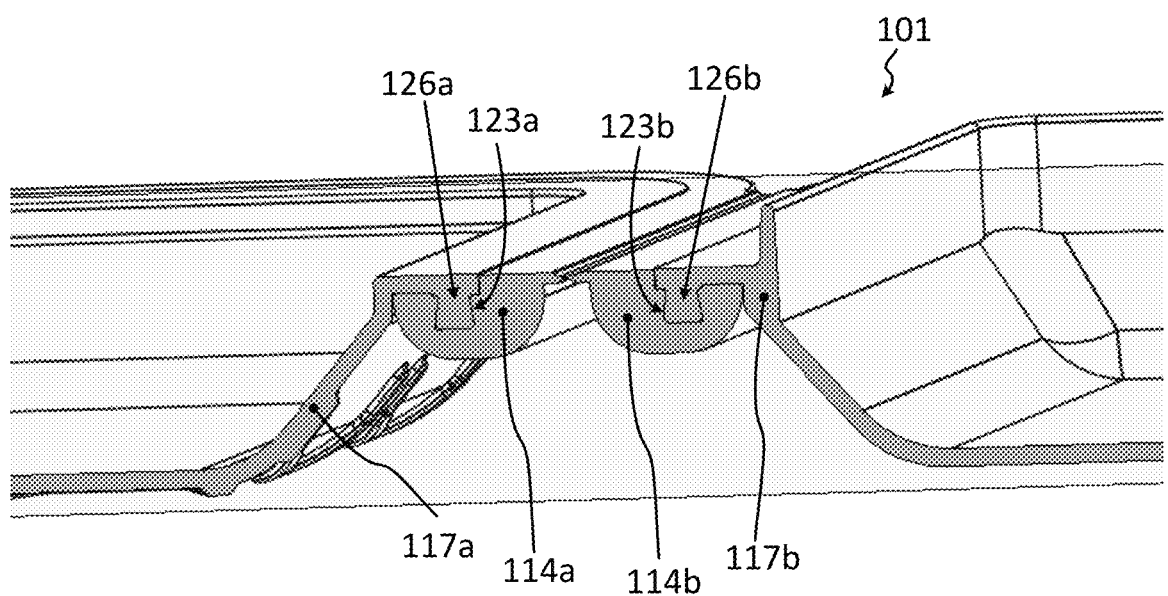
FIG. 5 is a perspective cross section of a portion of the storage container of FIG. 1.

FIG. 5 is a perspective cross section of the exemplary food storage container 101, showing additional detail of one manner in which the first frame component 114a may retain the first shell 117a and the second frame component 114b may retain the second shell 117b. In particular, as shown, each of the first and second frame components 114a and 114b may include a channel 123a and 123b, respectively; and each of the first and second shells 117a and 117b may include a corresponding ridge 126a and 126b, respectively, that are configured to interface with the channels 123a and 123*b*. In some implementations, the channels 123*a* and 123*b* and ridges 126*a* and 126*b* have a dovetail or key slot structure (e.g., with cooperating pins and tails; keys, keyways and key seats; etc.) that enables the frame components 114*a* and 114*b* to securely but releasably retain the shells 117*a* and 117*b*.

As indicated, the shells 117*a* and 117*b* may comprise an elastomeric material that is capable of being manipulated and temporarily compressed, such that ridges 126*a* and 126*b* can be squeezed into corresponding channels 123*a* and 123*b*, thereby forming a compression fit, in some implementations. A force in the opposite direction as that required to seat ridges 126*a* and 126*b* into corresponding channels 123*a* and 123*b* may facilitate unseating the shells 117*a* and 117*b* for their removal (e.g., as shown in FIG. 3 (e.g., for cleaning or replacement with different shells)). In other implementations, other retention mechanisms may be employed to releasably retain the shells 117*a* and 117*b* within the frames 114*a* and 114*b*. For example, separate retention pieces (not shown) may be employed; a temporary adhesive may be employed; a hook-and-loop system may be employed; fasteners may be employed; etc. In still other implementations, the shells 117*a* and 117*b* may not be removable from the frames 114*a* and 114*b* but may be adhered with an adhesive or molded together (e.g., one material may be over-molded over another material; or the shells 117*a* and 117*b* may be co-molded with the frames 114*a* and 114*b* from the same material).

Various features may be included in a food storage container 101 to enable it to remain securely closed, in the closed configuration 102*b* (see FIG. 2). In some implementations, the closure may be secure enough that an interior volume of the food storage container 101 is airtight relative to a space exterior to the interior volume, or even liquid tight. For example, as shown in FIG. 6A and illustrated in greater detail in the subsequent figures, some implementations include retention elements 129*a* and 129*b*, sealing elements 132*a* and 132*b*, and a locking mechanism 135 that may each assist in maintaining the food storage container 101 in a closed configuration and, in some implementations, maintaining a substantially airtight and/or liquid-tight seal between an interior volume 138 of the food storage container 101 and a space 141 exterior to the interior volume 138, when the food storage container 101 is in a closed configuration.

Figure 6A:
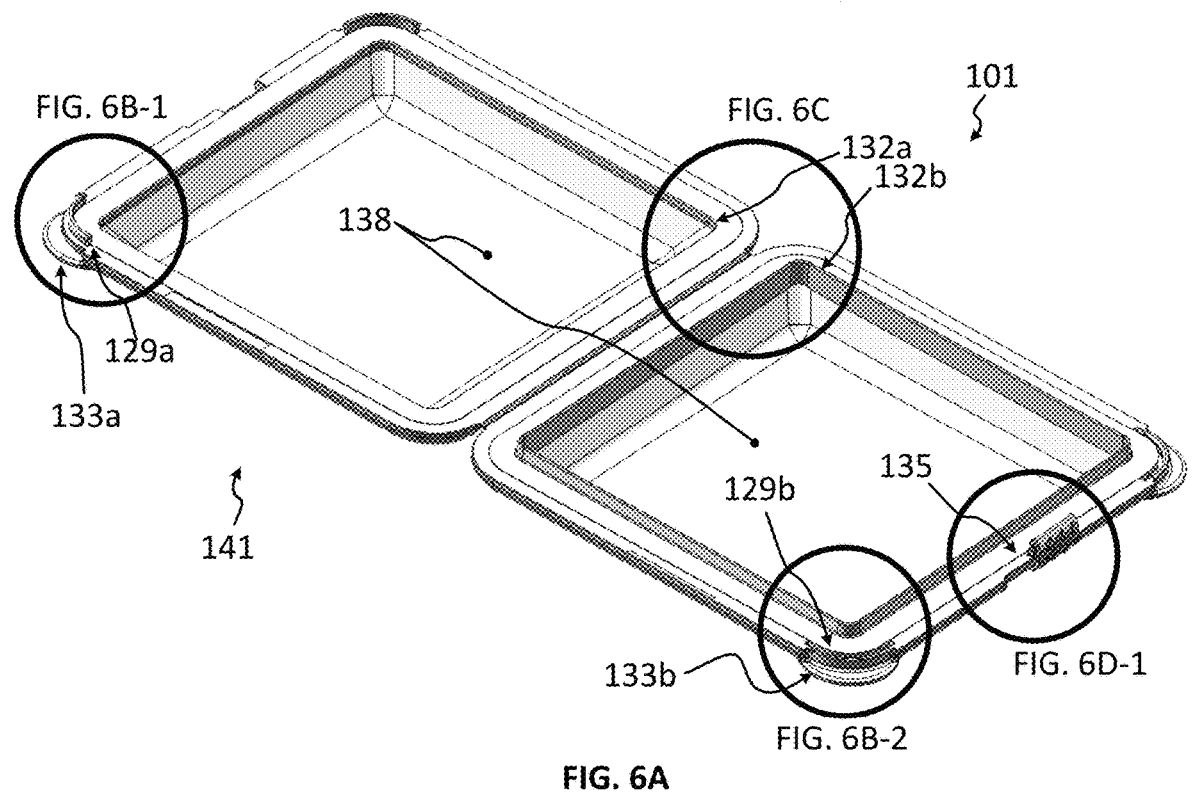
FIG. 6A illustrates various exemplary features that may enable a storage container to remain securely closed.
Figures 1, 6B:
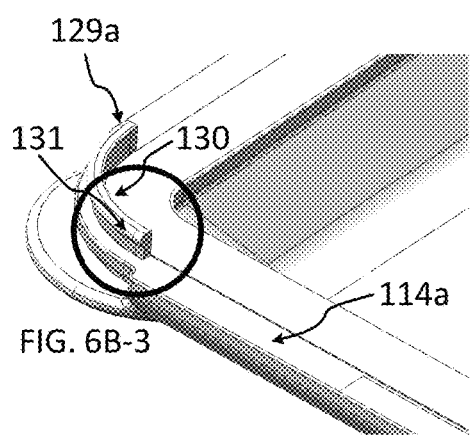
Figures 2, 6B:
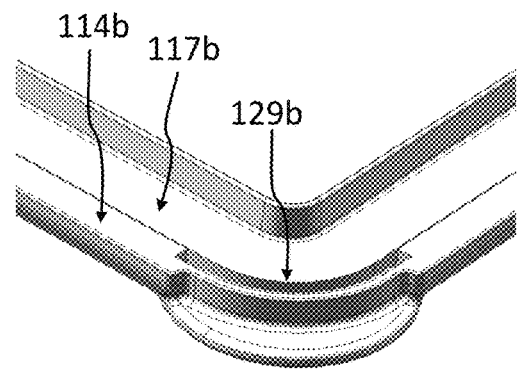
Figures 3, 6B:
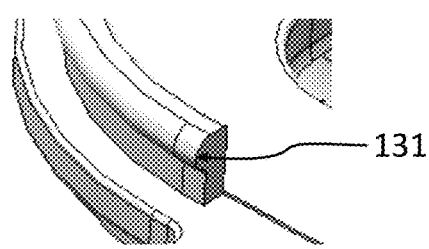

FIGS. 6B-1 and 6B-2 illustrate exemplary retention elements 129*a* and 129*b*. As shown, retention element 129*a* may comprise a raised protrusion 130 that is configured to interface with a corresponding receiving aperture 129*b*, and the protrusion 130 may further include a lip 131 (see FIG. 6B-3) that facilitates a compression fit when the retention element 129*a* is engaged with the corresponding receiving aperture 129*b*. In some implementations, the protrusion 130 and lip 131 may comprise a material that is softer than the first frame component 114*a* or the second frame component 114*b*, to further facilitate the aforementioned compression fit. In some implementations (e.g., as shown in FIG. 6B-2), spacing of the second shell 117*b* and the second frame component 114*b* may be such that a softer material of the second shell 117*b* may cooperate to facilitate the compression fit (e.g., by being disposed such that the lip 131 contacts the more rigid second frame component 114*b* in a closed configuration, pushing the protrusion 130 into the relatively softer second shell 117*b*—creating a compression fit that may tend to retain the food storage container in a closed configuration). In other implementations, the protrusion 130, lip 131 and receiving aperture 129*b* may be precisely dimensioned, and materials of the first and second frame components 114*a* and 114*b*, selected to facilitate an appropriate compression fit.

In some implementations, as shown in FIG. 6A, retention elements 129*a* and 129*b* may be disposed at corners of the food storage container 101; in other implementations, additional retention elements (including, for example, corresponding protrusions and receiving apertures) may be disposed at other points (e.g. the sides of the first and second frame components 114*a* and 114*b*). Tabs 133*a* and 133*b* may also be provided (e.g., at corresponding corners, as shown in FIG. 6A) to provide grips for a user to either pinch portions of the food storage container 101 together or pull portions of the food storage container 101 apart.

Figure 6C:
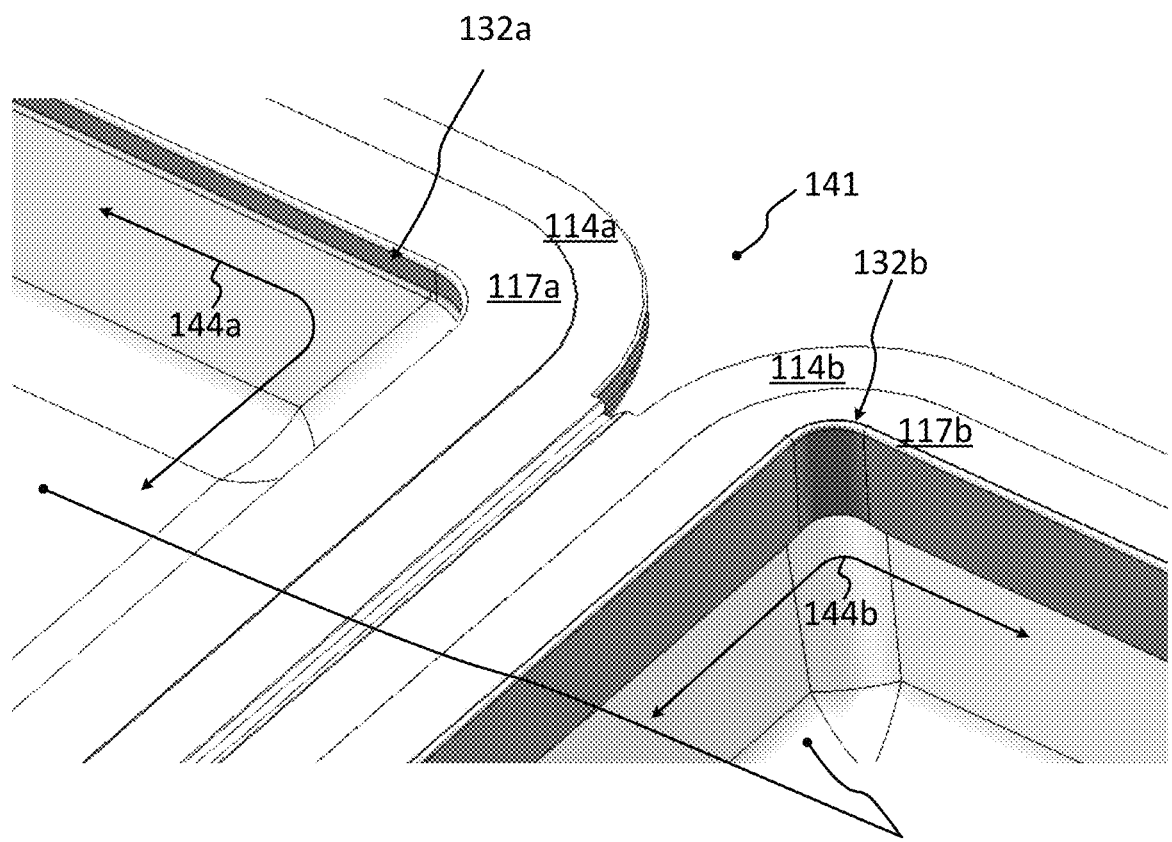
FIG. 6C illustrates exemplary sealing elements.

FIG. 6C illustrates exemplary sealing elements 132*a* and 132*b*. As shown, the sealing element 132*a* may comprise a seating edge 132*a* around an inner perimeter 144*a* of the first shell 117*a*, and a raised ridge 132*b* around an inner perimeter 144*b* of the second shell 117*b*. In a closed configuration, the raised ridge 132*b* may be disposed against the seating edge 132*a* around the perimeters 144*a* and 144*b*; and in such implementations, a resulting compression fit or friction fit that is formed that may be substantially airtight and/or liquid tight—such that an interior volume 138 is substantially isolated from a space 141 exterior the interior volume 138, and such that some user force is required to overcome the compression fit and separate the portions of the food storage container 101.

Figures 1, 6D:
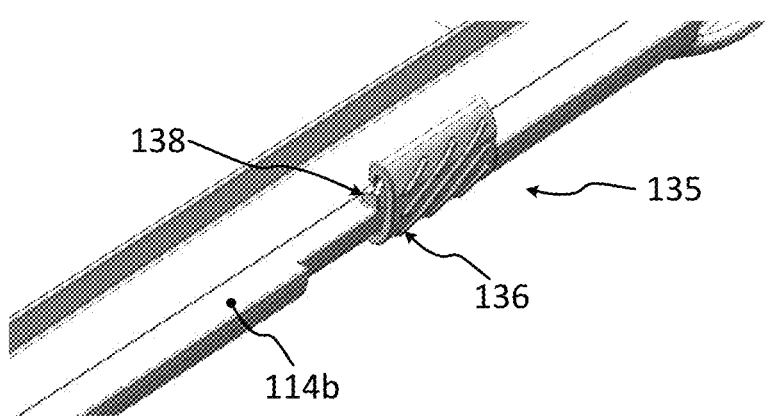
Figures 2, 6D:
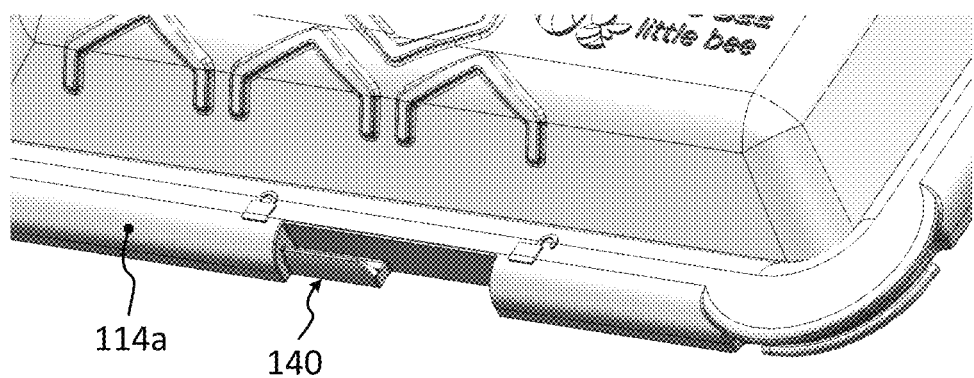
Figures 3, 6D:
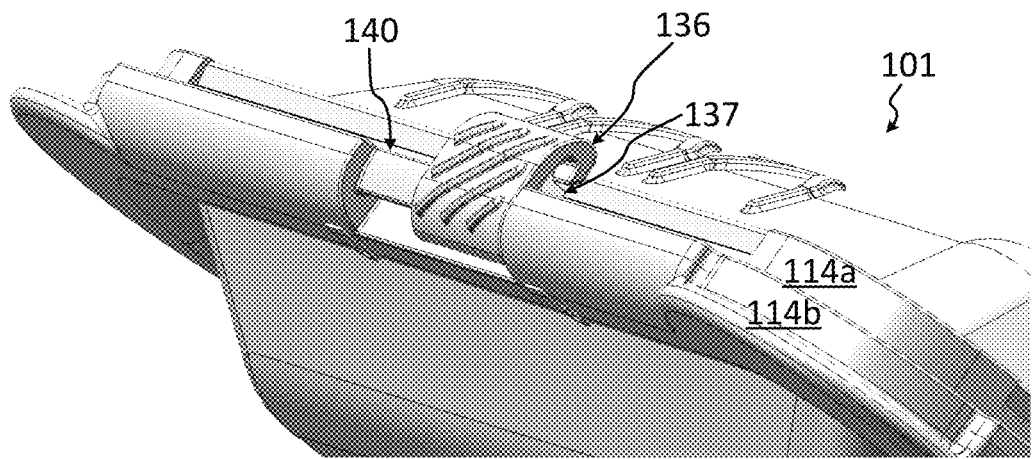

FIGS. 6D-1, 6D-2 and 6D-3 illustrate detail of an exemplary locking mechanism 135 that may further facilitate retention of the food storage container 101 in a closed configuration and/or contribute to an airtight and/or liquid-tight seal, in some implementations. As shown in FIG. 6D-1, the retention mechanism 135 may include a slide 136 and a track member 138 across which the slide 136 may be laterally translated. As shown in FIG. 6D-2, a corresponding latching member 140 may be provided that is configured to be engaged by the slide 136 when the food storage container is in a closed configuration. FIG. 6D-3 illustrates the food storage container 101 in a closed configuration, prior to the slide 136 being laterally disposed (to the left in FIG. 6D-3) to engage the latching member.

In some implementations, various components of the latching mechanism 135 may be dimensioned to form a compression fit when the locking mechanism 135 is disposed in a locking configuration (e.g., where the slide 136 engages both the track member 138 on the second frame component 114*b* and the latching member 140 on the first frame component 114*a*), such that some user force is required to overcome the compression force and transition the locking mechanism 135 from a locked configuration to an unlocked configuration. In some implementations, indicia may be provided to indicate locked an unlocked configurations of the locking mechanism 135, as illustrated in FIG. 6D-2.

While several implementations have been described with reference to exemplary aspects, it will be understood by those skilled in the art that various changes may be made and equivalents may be substituted for elements thereof without departing from the contemplated scope. For example, various possible materials are identified, but the components of various implementations may comprise other suitable materials. Certain features have been described as being disposed on one component or another (e.g., the first frame component or the second frame component), but such features may be differently disposed. Elements or features may be added in some implementations; and in other implementations, such elements or features may be omitted. Other locking mechanisms may be employed (e.g., snaps, clasps, fasteners, etc.). More than one locking mechanism may be employed (e.g., multiple slides). A food storage container may have a shape other than the substantially square shape that is illustrated and described. The first shell may be made of one material and the second shell may be made of a different material. Sealing structures (e.g., raised ridges and corresponding seating edges may be disposed on either or both of shells and frame components. Various implementations have been described with reference to storing food items; but the containers described and illustrated herein may be used to store other non-food items. Other variations are possible to adapt a particular situation or material to the teachings provided herein without departing from the essential scope thereof. Therefore, it is intended that the scope not be limited to the particular aspects or implementations disclosed but include all aspects falling within the scope of the appended claims.

What is claimed is:

1. A storage container comprising:
 a frame structure having a hinge with a pivot axis, a first frame component, and a second frame component; the hinge coupling the first frame component and the second frame component and configured to facilitate rotation about the pivot axis (i) of the first frame component away from the second frame component to achieve an open configuration or (ii) of the first frame component toward the second frame component to achieve a closed configuration;
 a first shell that is configured to be releasably secured by the first frame component, and a second shell that is configured to be releasably secured by the second frame component; wherein, when the first shell is secured by the first frame component, the second shell is secured by the second frame component, and the storage container is in the closed configuration, an interior volume bounded by the frame structure, first shell and second shell is isolated from a space exterior to the interior volume; and
 a securing structure configured to facilitate maintenance of the storage container in the closed configuration;
 wherein the frame structure comprises a material having a Shore A durometer of about 50 to about 80; wherein at least one of the first shell or the second shell comprises a food-grade silicone having a Shore A durometer of about 35-45; wherein the first shell comprises a seating edge around a first-shell inner perimeter and the second shell comprises a raised ridge around a second-shell inner perimeter; and wherein the seating edge and raised ridge are configured to form a friction fit when the frame structure is in the closed configuration that isolates, in a substantially airtight and liquid-tight manner, the interior volume from the space exterior to the interior volume.

2. The storage container of claim 1, wherein at least one of the first shell or the second shell comprises a semi-translucent food-grade silicone.

3. The storage container of claim 1, wherein the frame structure comprises a polypropylene, plastic, polymer, stiff rubber or silicone.

4. The storage container of claim 1, wherein the first frame component and second frame component comprise tabs at corresponding corners that are configured to allow a user to pinch together the first frame component with its corresponding first shell and the second frame component with its corresponding second shell or to pull apart the first frame component with its corresponding first shell from the second frame component with its corresponding second shell.

5. The storage container of claim 1, wherein the hinge is reinforced with fibers perpendicular to its pivot axis.

6. A storage container comprising:
 a frame structure having a hinge with a pivot axis, a first frame component, and a second frame component; the hinge coupling the first frame component and the second frame component and configured to facilitate rotation about the pivot axis (i) of the first frame component away from the second frame component to achieve an open configuration or (ii) of the first frame component toward the second frame component to achieve a closed configuration;
 a first shell that is configured to be releasably secured by the first frame component, and a second shell that is configured to be releasably secured by the second frame component; wherein, when the first shell is secured by the first frame component, the second shell is secured by the second frame component, and the storage container is in the closed configuration, an interior volume bounded by the frame structure, the first shell and the second shell is isolated from a space exterior to the interior volume; and
 a securing structure configured to facilitate maintenance of the storage container in a closed configuration;
 wherein each of the first frame and second frame comprise a tab at corresponding corners that are configured to allow a user to pinch together the first frame component with its corresponding first shell and the second frame component with its corresponding second shell or to pull apart the first frame component with its corresponding first shell from the second frame component with its corresponding second shell.

7. The storage container of claim 6, wherein the first shell and the second shell comprise a food-grade silicone.

8. The storage container of claim 6, wherein the first shell and the second shell comprise a flexible material.

9. The storage container of claim 6, wherein the securing structure comprises a raised protrusion disposed in the first frame component and a corresponding receiving aperture in the second frame component, wherein the raised protrusion and the corresponding receiving aperture are configured to form, when engaged, a compression fit that releasably secures the first frame component to the second frame component.

10. The storage container of claim 6, wherein the securing structure comprises a slidable locking member that is actuatable in either a locked or unlocked position; wherein, in the locked position, the slidable locking member engages locking members of both the first frame component and the second frame component to prevent them from being separated; and wherein, in the unlocked position, the slidable locking member does not engage both the locking members, thereby allowing the first frame component and second frame component to be separated.

11. The storage container of claim 6, wherein the first frame component comprises a raised ridge about its inner perimeter, and the second frame component comprises a corresponding seating edge about its inner perimeter, such that in a closed configuration, the raised edge and corresponding seating edge cooperate to form a friction fit that resists separation of the first frame component and the second frame component.

12. The storage container of claim 11, wherein the friction fit further resists passage of liquid from the interior volume to the space exterior to the interior volume.

13. The storage container of claim 6, wherein one of the first frame component and the first shell comprises a dovetail pin and the other one of the first frame component and the first shell comprises a dovetail tail.

14. The storage container of claim 6, wherein the frame structure comprises a material having a Shore A durometer of about 50 to about 80, and wherein at least one of the first shell or the second shell comprises a material having a Shore A durometer of about 25-60.

15. The storage container of claim 6, wherein the frame structure comprises a polypropylene, plastic, polymer, stiff rubber or silicone; and wherein the first shell and the second shell comprise a food-grade silicone.

16. The storage container of claim 6, wherein the hinge is reinforced with fibers perpendicular to its pivot axis.

17. The storage container of claim 6, wherein the hinge is a distinct component from the first frame component and second frame component; and wherein the hinge is coupled to the first frame component and to the second frame component.

18. A storage container comprising:
a frame structure having a hinge with a pivot axis, a first frame component, and a second frame component; the hinge coupling the first frame component and the second frame component and configured to facilitate rotation about the pivot axis (i) of the first frame component away from the second frame component to achieve an open configuration or (ii) of the first frame component toward the second frame component to achieve a closed configuration; and
a first shell that is configured to be releasably secured by the first frame component, and a second shell that is configured to be releasably secured by the second frame component;
wherein, when the first shell is secured by the first frame component, the second shell is secured by the second frame component, and the storage container is in the closed configuration, an interior volume bounded by the frame structure, the first shell and the second shell is isolated from a space exterior to the interior volume;
wherein, the first frame component comprises a raised protrusion and the second frame component comprises a corresponding receiving aperture, wherein the raised protrusion and the corresponding receiving aperture are configured to form, when engaged, a compression fit that releasably secures the first frame component to the second frame component; and
wherein the first frame component and second frame component comprise tabs at corresponding corners that are configured to allow a user to pinch together the first frame component with its corresponding first shell and the second frame component with its corresponding second shell or to pull apart the first frame component with its corresponding first shell from the second frame component with its corresponding second shell.

19. The storage container of claim 18, wherein the first shell comprises a seating edge around a first-shell inner perimeter and the second shell comprises a raised ridge around a second-shell inner perimeter; and wherein the seating edge and raised ridge are configured to form a friction fit when the frame structure is in the closed configuration.

20. The storage container of claim 19, wherein the friction fit resists passage of liquid from the interior volume to the space exterior to the interior volume.

\* \* \* \* \*